United States Patent

[11] 3,582,801

[72] Inventors David O. Hansen
Westminister;
Neal L. Roy, Redondo Beach, both of Calif.
[21] Appl. No. 815,110
[22] Filed Apr. 10, 1969
[45] Patented June 1, 1971
[73] Assignee TRW Inc.
Redondo Beach, Calif.

[54] VOLTAGE AMPLIFYING CIRCUIT
7 Claims, 3 Drawing Figs.

[52] U.S. Cl. .......... 330/26, 330/29, 330/32, 330/85, 330/93, 330/156
[51] Int. Cl. .......... H03f 1/38
[50] Field of Search .......... 330/26, 32, 85, 93, 108, 112, 156, 29; 328/176

[56] References Cited

UNITED STATES PATENTS

| | | | |
|---|---|---|---|
| 2,810,071 | 10/1957 | Race | 330/32X |
| 3,169,228 | 2/1965 | Sinniger | 330/26X |
| 3,328,519 | 6/1967 | Willis | 330/156X |

*Primary Examiner*—Roy Lake
*Assistant Examiner*—James B. Mullins
*Attorneys*—Daniel T. Anderson, William B. Leach and Donald W. Graves

ABSTRACT: A circuit which includes a pulse transformer provides an amplified output voltage. A feedback loop utilizes a bootstrapping technique to establish a transformer secondary coil reference potential which is a function of the circuit output voltage. The amplified circuit output effectively increases a typical turns-ratio of 5 to an effective value of 50.

David O. Hansen
Neal L. Roy
*INVENTORS*

BY William B. Leach

ATTORNEY

VOLTAGE AMPLIFYING CIRCUIT

BACKGROUND OF THE INVENTION

The invention disclosed herein is particularly suited for use in association with pulse transformers. Pulse transformers find use in the transmission and shaping of pulses which typically range in duration from a nanosecond to about 25 microseconds or greater. Extensive application has been made of pulse transformers. They may be used to change the pulse amplitude, impedance, or polarity, to provide DC isolation, to couple between stages of amplifiers, and for other well-known applications.

One of the functions of any circuit device, such as a transformer, is to faithfully reproduce the input signal. When the input signal is a voltage pulse, the transformer output must therefore have a fast rise time response. It is well known that leakage inductance and shunt capacitance adversely affect the response of a pulse transformer. Furthermore, as the turns-ratio of the secondary to primary inductors increases, the effects of leakage inductance and shunt capacitance rapidly increases. It can be shown that the load and interwinding capacitances are multiplied by approximately the turns-ratio squared.

Thus it is necessary to limit the turns-ratio of pulse transformers to less than 10 to 1 and most often to 6 to 1. A typical ratio is 4 to 1.

It is accordingly an object of the present invention to provide a circuit for use in association with a transformer for effectively increasing the turns-ratio thereof.

Another object of the present invention is to provide a pulse transformer circuit having a low output impedance.

A further object of the present invention is to improve the amplifying characteristics of a pulse transformer.

SUMMARY OF THE INVENTION

A voltage-amplification bootstrapping circuit is provided which may be used to effectively increase the turns-ratio of a pulse transformer. A source of variable electrical potential is coupled to an impedance element such as the secondary inductor coil of a transformer. An amplifier is coupled to the impedance element for deriving a low impedance output and having essentially unity voltage gain. An emitter follower may be used. A portion of the potential appearing at the amplifier output terminal is impressed upon a reference terminal of the impedance element, thus providing a bootstrap type circuit. When an input voltage is impressed across the impedance element, a portion thereof is impressed upon the reference terminal of the impedance element. Thus, the impedance reference terminal is lifted above a reference potential by a value derived from its own output signal.

The voltage at the amplifier output therefore appears to be generated by a transformer having a very large turns-ratio. On the other hand, favorable transformer characteristics such as fast response time are retained.

The foregoing and other objects of the present invention will become more and better understood when taken in conjunction with the following description and accompanying drawings, throughout which like characters indicate like parts and which drawings form a part of this application.

DESCRIPTION OF THE PREFERRED EMBODIMENTS

Figure 1:
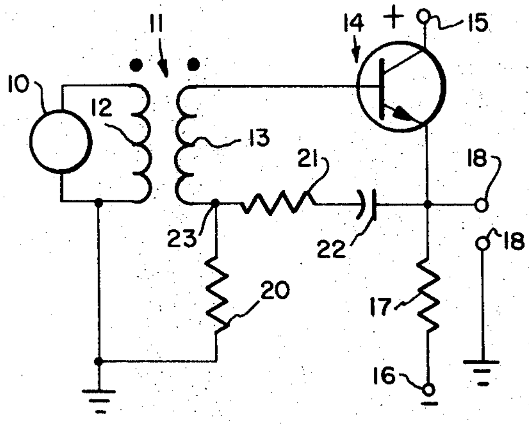
FIG. 1 is a circuit diagram of an electronic circuit embodying the principle of the present invention and which will be used for analyzing the operation thereof.

Referring now to the drawings and particularly to FIG. 1, there is illustrated a bootstrap circuit embodying the present invention. This bootstrap circuit has the purpose to effectively increase the turns-ratio of a pulse transformer. Accordingly, there is illustrated a generator 10 for producing an electric signal to be impressed upon the remainder of the circuit. The balance of the discussion herein will be confined to a signal having a voltage pulse wave form. The generator 10 is coupled to the primary inductor or coil 12 of a transformer 11. One terminal of inductor 12 is connected to a first fixed reference potential such as ground. The generator 10 is connected to the same fixed reference potential.

One terminal of the secondary inductor 13 of transformer 11 is connected to the base electrode of transistor 14. Transistor 14 may be of the NPN type and is connected as an emitter follower. The collector of transistor 14 is connected to a positive bias voltage source at terminal 15 and the emitter of transistor 14 is connected to a negative bias voltage source at terminal 16 through emitter resistor 17. An output signal is obtained from the emitter electrode of transistor 14. Accordingly, a circuit output signal may be obtained from output terminals 18, one of which is connected to the emitter of transistor 14, while the other one is connected to another fixed reference potential which also may be ground.

The lower terminal 23 of inductor 13 of transformer 11 is connected to the first fixed reference potential through a first voltage dividing resistor 20. To complete the circuit, there is connected in series between the lower terminal 23 of inductor 13 and the emitter of transistor 14 a second voltage dividing resistor 21 and a DC blocking capacitor 22.

The operation of the circuit may now be analyzed. For this purpose, the turns-ratio of the transformer 11 will be assumed to be unity so as to simplify the analysis. A descriptive circuit equation may be written as follows.

$$E_0=\alpha E_1=\alpha\left(e+\frac{R_{20}}{R_{21}+R_{20}}E_0\right)$$

In the foregoing expressions, $E_o$ is representative of the output voltage at output terminals 18 and $E_1$ represents the voltage which appears at the base of transistor 14. The term alpha is the gain of the transistor from the base to the emitter and has a value less than but very close to unity. It may be seen that the voltage $E_1$ is the summation of the voltage across inductor 13 represented by $e$ and the voltage drop across the first voltage dividing resistor 20 represented by the term $R_{20}/(R21+R_{20})\cdot E_o$. The latter term is descriptive of the fact that resistors 20, 21 serve as a voltage divider for the purpose of impressing a portion of the output voltage upon terminal 23. The foregoing equations may be rearranged as follows:

$$E_0=\frac{\alpha e}{1-\alpha\frac{R_{20}}{R_{20}+R_{21}}}$$

It will be appreciated that since ordinarily the value of alpha is 0.99 or greater, and the voltage divider ratio ($R_{20}/R+R_{21}$) is ordinarily 0.95 or less, little error will be made if alpha is replaced by unity. The above equation may then be further arranged as follows:

$$E_0=\frac{e(R_{20}+R_{21})}{R_{21}}$$

To further explain the operation of the circuit we may assume that a voltage pulse is produced by generator 10 and impressed upon the primary coil 12 of transformer 11. Since the turns-ratio of transformer 11 has been assumed to be unity, the input voltage pulse will appear across the secondary inductor 13 of transformer 11. The input voltage will also appear at both the base and emitter of transistor 14 since we have assumed that the alpha term is essentially unity. The varying input signal appearing at the emitter will be passed by the capacitor 22 and a portion thereof will appear at terminal 23 in accordance with the values of resistors 20, 21. By way of example, if resistor 20 has a resistance value which is 90 percent of the total series resistance of resistor 20 and 21, then 90 percent of the input voltage signal will appear at terminal 23. As an approximation, it may be assumed that resistor 21 contributes the only voltage drop in the loop which includes the inductor 13, the transistor base to emitter circuit, and the capacitor 22.

As has been noted, an alternating signal input across inductor 12 will induce a similar drop across inductor 13 of transformer 11. If the input signal rises to 1 volt, this 1 volt drop must also appear across inductor 13 and will also appear across resistor 21. This 1 volt across resistor 21 represents 10 percent of the total voltage drop across resistor 21 and 20. Thus, for balanced conditions there must be a 9 volt drop across resistor 20. It then follows that there is a 9 volt potential at terminal 23 which is elevated by the induced 1 volt input signal across inductor 13 to a value of 10 volts which appears at the output terminal 18.

The foregoing example has demonstrated that the described circuit enables the output of a pulse transformer to be increased by a factor of 10 In the general case, the output is increased by a factor which is represented by the term $(R_{20}+R_{21})/R$. As previously noted, pulse transformers are typically operated with a turns-ratio of 4 to 1. It is thus seen that a typical pulse transformer utilized in the above-described circuit with the resistance values set forth below may perform with an effective turns-ratio in the range of 44, i.e., an 11 fold increase. This is a marked and dramatic increase over the state of the art application of pulse transformers.

It will be understood that the above-described circuit may vary according to the design for a particular application. The following circuit specifications are included by way of example only.

| | |
|---|---|
| Transformer **11** | UTC type H-65, turns-ratio of 4 |
| Transistor **14** | 2N3643 |
| Bias Voltage supplies | ±25 volts |
| Resistor **17** | 3900 ohms |
| Resistor **20** | 1200 ohms |
| Resistor **21** | 120 ohms |
| Capacitor **22** | 10 microfarads |

The circuit having the foregoing specifications compares very favorably with the performance of the transformer when conventionally connected with the secondary inductor terminated with a 1200 ohm load resistor. The transformer primary inductor was supplied with a 0.2 volt input square wave pulse signal.

The unbootstrapped transformer secondary or output signal was observed and recorded on an oscilloscope. The output signal amplitude was about 0.8 volts, has a rise time of about 100 nanoseconds, and a pulse width of about 2 microseconds. Thus, it is seen that the unbootstrapped transformer displayed a typical effective turns-ratio of about 4 to 1.

The bootstrapped transformer circuit in accordance with the present invention had an output signal which rose to about 8 volts which imparts to the transformer operating an effective turns-ratio of about 40 or more. Thus, a 10 fold increase in turns-ratio operation was obtained and is only a little less than the approximation in the above analysis. While the output amplitude was greatly increased, the rise time remained at about 100 nanoseconds and the pulse width at 2 microseconds. Pulse width was measured on the output trace at which the pulse had decayed 50 percent. As previously noted, the output impedance of the bootstrapped transformer is much lower than that at the transformer secondary inductor.

It should be noted that the values of the voltage dividing resistors 20, 21 have certain limits. The value of resistor 21 should be large compared to the transistor output impedance. This assists in maintaining the alpha of the transistor close to unity.

Figure 3:
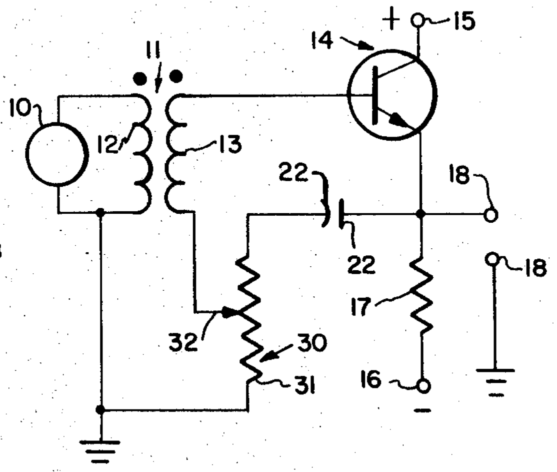
FIG. 3 is a circuit diagram showing another alternative embodiment in which the gain of the circuit is variable.
Figure 2:
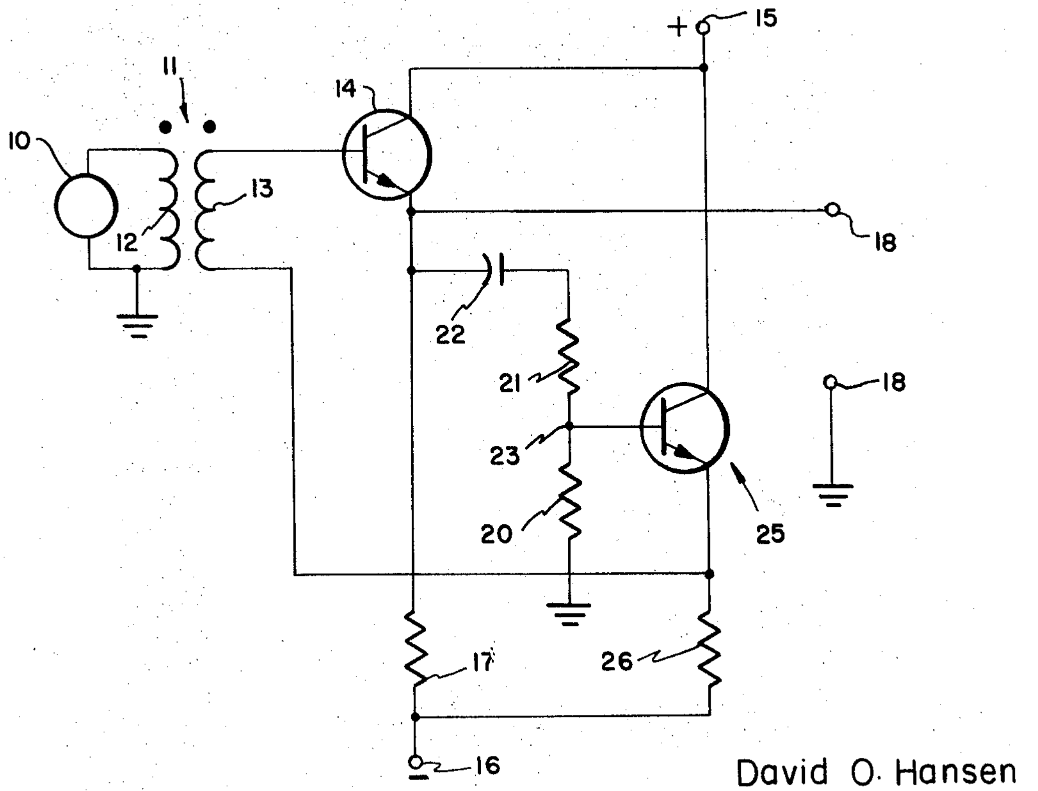
FIG. 2 is a circuit diagram showing an alternative embodiment which provides more element isolation.

Variations of the basic circuit for particular applications are possible. FIGS. 2 and 3 show two such variations. Referring to FIG. 2 it is clear that much of the circuit of FIG. 1 is retained. As was the case in the circuit of FIG. 1, the bootstrapping feedback portion of the circuit is connected between the emitter electrode of transistor 14 and the secondary inductor 13 of transformer 11. The bootstrapping portion of the circuit in FIG. 2 includes the DC blocking capacitor 22, the first voltage dividing resistor 20, and the second voltage dividing resistor 21 serially connected between the emitter of transistor 14 and ground. The connection between the voltage dividing resistors is labeled 23 to which is connected the base of feedback transistor 25. Transistor 25 may be identical to transistor 14 and is also connected as an emitter follower. For biasing purposes, the collector electrode of transistor 25 is connected to the positive voltage source 15 and the emitter is connected to the negative voltage source 16 through biasing resistor 26. The emitter electrode of transistor 25 is also connected directly to the secondary inductor 13 of transformer 11 as shown.

The operation of the circuit in FIG. 2 may now be analyzed. Again, the turns-ratio of the transformer 11 will be assumed to be unity for purposes of simplification. Also, the gain alpha of each transistor 14, 25 may be assumed to be unity. It then follows that an input voltage signal across inductor 12 will be duplicated across inductor 13 and appear at the base of transistor 14. That signal will be transmitted with essentially no loss to the emitter of transistor 14 and appear at the circuit output terminals 18. The signal appearing at the emitter of transistor 14 will also be transmitted by capacitor 22 and a portion of the voltage will appear at junction 23 in accordance with values assigned to the voltage dividing resistors 20, 21. The apportioned signal appearing at the junction 23 will be transmitted through the transistor 25 and appear with essentially no loss at the emitter thereof and in turn will be fed back to the secondary inductor of transformer 11. As earlier described, this process continues until a balanced condition is obtained, thus evaluating the circuit output voltage at terminals 18 to a level much in excess of that which may be obtained with the transformer alone. Here again, the output impedance of the bootstrapped transformer is much lower than that at the transformer secondary inductor.

The circuit of FIG. 2 allows greater freedom in the choice of voltage dividing resistors 20, 21. In the discussion of FIG. 1, it was noted that the value of voltage dividing resistor 21 should be large compared to the transistor output impedance so as to maintain the alpha of transistor 14 close to unity. In the circuit of FIG. 2, the operation of transistor 14 is not only influenced by the impedance of resistor 21, but also by the impedance of resistor 20 and the high impedance input of transistor 25. Thus, the value of resistor 21, as used in the circuit of FIG. 2, need not have as large a value as when used in the circuit of FIG. 1.

The circuitry of FIG. 2 provides a further advantage. The feedback transistor 25, operating as an emitter follower, provides a low output impedance at its emitter. The emitter provides the driving source for the feedback voltage which is impressed upon the secondary inductor 13 of transformer 11. Because of this low impedance driving source, the circuit conditions at the secondary inductor 13 will be somewhat more stable than that of the circuit in FIG. 1.

Turning now to FIG. 3 there is shown another variation of the circuit in FIG. 1. In this variation the voltage dividing resistors 20, 21, and the common junction 23 are replaced by a potentiometer 30. The potentiometer includes resistor 31 serially connected between capacitor 22 and the first fixed reference potential. The potentiometer 30 further includes a continuously adjustable sliding contact 32 which is connected to the secondary inductor 13. This variation imparts to the circuit the feature of having a continuously adjustable circuit amplification.

A further variation may be made to the circuit of FIG. 2. The transistor 14 may be replaced by a field effect transistor which would be connected as a source follower. Since a field effect transistor has a very high input impedance, this circuit variation may be useful with transformers which have a high output impedance. By way of example, the field effect transistor may be an N-channel device, such as a 2N4416.

There has thus been described an electronic circuit including a pulse-type transformer for providing a circuit output which substantially increases the effective turns-ratio of the transformer. It also provides a low output impedance which is usually not available at the typical transformer output. The amplifying characteristics of a pulse transformer have thus been substantially improved without detracting from the response time thereof nor adding distortion to the waveform.

We claim:

1. An electric circuit for amplifying an input voltage pulse comprising:

a. an impedance element across which a signal voltage may be impressed;

b. a transistor connected as an emitter follower so as to have a low output impedance and having its base connected to one terminal of said impedance element;

c. signal output means connected directly between the emitter electrode of said transistor and a fixed reference potential for defining a circuit output signal; and d. a voltage divider coupled between a fixed reference potential and the emitter electrode of said transistor and having an intermediate point connected to the other terminal of said impedance element.

2. The electric circuit of claim 1 wherein said impedance element comprises the secondary inductor of a transformer and the circuit further includes a capacitor connected between the emitter electrode of said transistor and said voltage divider.

3. The electric circuit of claim 2 wherein said voltage divider comprises a potentiometer.

4. An electric circuit for amplifying an input voltage pulse comprising:

a. a pulse transformer having a primary and secondary inductor;

b. a transistor connected as an emitter follower and having the base electrode directly coupled to one terminal of the secondary inductor of said pulse transformer and the emitter terminal coupled to a fixed reference potential;

c. a direct current blocking capacitor having one terminal connected to the emitter electrode of said transistor; and d. a voltage divider coupled between said capacitor and a fixed reference potential, said voltage divider having an intermediate point connected to the other terminal of the secondary inductor thereby impressing a portion of the output voltage signal thereon.

5. In an electric circuit of the type which includes a pulse transformer having a secondary inductor, the improvement comprising:

a. a transistor connected as an emitter follower so as to have a low output impedance and having its base directly connected to one terminal of the secondary inductor;

b. a capacitor directly coupled to the emitter terminal of said transistor for blocking direct current signals; and c. a voltage divider connected between said capacitor and a fixed reference potential, said voltage divider having an intermediate point connected to the transformer secondary inductor.

6. The electric circuit of claim 5 wherein said circuit further includes a feedback transistor connected as an emitter follower and having the base electrode connected to said voltage divider intermediate point and having the emitter electrode connected to the transformer secondary inductor.

7. The electric circuit of claim 5 wherein said voltage divider is a potentiometer whereby the circuit amplification is variable.